(12) United States Patent
Servais et al.

(10) Patent No.: US 9,467,869 B2
(45) Date of Patent: Oct. 11, 2016

(54) CELL COVERAGE ASSIGNMENT

(71) Applicant: QUALCOMM Incorporated, San Diego, CA (US)

(72) Inventors: Frederic Servais, Los Gatos, CA (US); Ferit Akgul, San Jose, CA (US); David Coleman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/743,090

(22) Filed: Jun. 18, 2015

(65) Prior Publication Data

US 2016/0088490 A1 Mar. 24, 2016

Related U.S. Application Data

(60) Provisional application No. 62/052,986, filed on Sep. 19, 2014.

(51) Int. Cl.
*H04W 16/18* (2009.01)
*H04W 64/00* (2009.01)
*H04W 24/02* (2009.01)
*H04W 16/24* (2009.01)
*H04W 84/04* (2009.01)
*H04W 36/02* (2009.01)

(52) U.S. Cl.
CPC ............ *H04W 16/18* (2013.01); *H04W 24/02* (2013.01); *H04W 64/003* (2013.01); *H04W 16/24* (2013.01); *H04W 36/023* (2013.01); *H04W 84/042* (2013.01)

(58) Field of Classification Search
CPC ..................................................... H04W 16/18
USPC ........................................................ 455/446
See application file for complete search history.

(56) References Cited

U.S. PATENT DOCUMENTS

| | | |
|---|---|---|
| 2003/0125044 A1 | 7/2003 | Deloach et al. |
| 2003/0169762 A1 | 9/2003 | Wee Ho et al. |
| 2006/0217130 A1* | 9/2006 | Rowitch ............... G01S 19/252 455/456.1 |
| 2012/0082084 A1* | 4/2012 | Balakrishnan .... H04W 72/1215 370/315 |
| 2013/0150084 A1 | 6/2013 | Kolhe |
| 2014/0029468 A1 | 1/2014 | Akgul et al. |
| 2014/0031055 A1 | 1/2014 | Do et al. |
| 2014/0274113 A1 | 9/2014 | Teed-Gillen et al. |

FOREIGN PATENT DOCUMENTS

| | | |
|---|---|---|
| EP | 1450574 A2 | 8/2004 |
| EP | 2663120 A2 | 11/2013 |

OTHER PUBLICATIONS

International Search Report and Written Opinion—PCT/US2015/045826—ISA/EPO—Nov. 4, 2015, 12 pgs.

(Continued)

*Primary Examiner* — Christopher M Brandt
(74) *Attorney, Agent, or Firm* — Hunter Clark PLLC

(57) ABSTRACT

A method includes: identifying a target network cell; obtaining at least one parameter value indicative of an operating environment of the target network cell; determining a maximum antenna range (MAR) associated with the target network cell based on the at least one parameter value; and applying the MAR to the target network cell.

31 Claims, 9 Drawing Sheets

(56) References Cited

OTHER PUBLICATIONS

Neidhardt, E., et al., "Estimating locations and coverage areas of mobile network cells based on crowdsourced data", Wireless and Mobile Networking Conference (WMNC), 2013 6th JOINT IFIP, IEEE, Apr. 23, 2013 (Apr. 23, 2013), pp. 1-8, XP032432272, DOI: 10.1109/WMNC.2013.6549010 ISBN: 978-1-4673-5615-2, the whole document.

Rameshkrishnaa, G., "Position Determination in CDMA Networks using Pilot Beacons," University of Colorado at Boulder, 2010, 106 pgs.

Second Written Opinion from International Application No. PCT/US2015/045826, mailed Aug. 8, 2016, 7 pgs.

* cited by examiner

CELL COVERAGE ASSIGNMENT

CROSS-REFERENCE TO RELATED APPLICATIONS

This application claims priority to and the benefit of U.S. Provisional Patent Application Ser. No. 62/052,986, entitled "CELL COVERAGE ASSIGNMENT FOR CROWD-SOURCED NETWORKS," filed Sep. 19, 2014, which is assigned to the assignee hereof, the entire contents of which are hereby incorporated herein by reference.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

As more wireless communication devices are deployed, additional wireless communication network cells have been added to manage the additional communication traffic load. When wireless communication network cells are added into the cellular network, their maximum antenna range (MAR) is typically set by the carrier to a default value of 23.167 km. The MAR is typically statically set when the carrier sets up a base station.

SUMMARY

Implementations are described for setting the maximum antenna range (MAR) for a target network cell in a wireless communication network in accordance with network cell information. Network cell information may be information associated with the target network cell and/or with neighboring network cells that describes network, operational and/or environmental parameters. The network cell information includes one or more parameter values associated with the network, operation and/or environment of the target network cell, the neighboring network cells and/or client devices, such as wireless mobile devices, that are associated with one or more network cells, as discussed in greater detail below. The target network cell is a cell for which the MAR may be adjusted or set in accordance with techniques described herein, and may include a base station and/or tower associated with an antenna used for wireless communication in a cellular network. A neighboring network cell is a cell that is within a certain range of the target network cell. A number of neighboring network cells may be located in a generally radial direction from the target network cell, such that one or more neighboring network cells may be located in between the target network cell and another neighboring network cell.

The MAR may be set automatically, e.g, without user or operator intervention, such as intermittently (e.g., at periodic intervals) or in response to one or more events, or may be set by a user or operator. The setting of an MAR may be applied to existing or new network cells that are identified by mobile devices or by entries in records that are associated with the existing or newly defined network cells. Adjustments may be made to MARs associated with existing network cells using information obtained from mobile devices and/or from entries in records describing the network cells or from other sources. The automated setting or adjustment of MARs for new or existing network cells can be undertaken based on the occurrence of a predetermined event, such as, for example, when the MAR of a neighboring network cell changes, when an interval of time has elapsed, at certain times and/or dates, when a new network cell is recognized, and/or combinations of these events and/or other useful events that contribute to managing MARs for a wireless communication network.

The MAR may be set based on network topology parameters such as distances of the target network cell from other network cells or density of network cells around the target network cell. The MAR may be set based on population parameters such as density of network cells around the target network cell or number of users served by the target network cell or by the network cells around the target network cell. The radio frequencies used by the target network cell may also be used to determine the MAR in accordance with a signal propagation model for the target network cell. By setting the MAR of the target network cell based on the above noted parameters, improved management and operation of the target network cell may be achieved.

An example of a method described herein includes identifying a target network cell, obtaining at least one parameter value indicative of an operating environment of the target network cell, determining a maximum antenna range (MAR) associated with the target network cell based on the at least one parameter value and applying the determined MAR to the target network cell. The method may include receiving, from at least one of a set of client devices via a communication network, or from other resources, including network cells, network cell information related to the target network cell and/or one or more neighboring network cells. The network cell information may include values of parameters related to operation of the communication network, communication usage or other parameters related to operation and/or the environment of the target network cell and/or the one or more neighboring network cells. In some examples, the network cell information includes a current MAR, a position, a number of users and/or a radio frequency of the target network cell and/or one or more neighboring network cells. Network cell information may include or identify operational capabilities, for example data rates or voice or data bandwidth or available radio or carrier frequencies or number of antennas or number of users served or directional signal strength and other capabilities related to a target network cell and/or one or more neighboring network cells. Network cell information may also or alternatively include or identify environmental characteristics, for example position, altitude, local signal propagation models, time zone and other environmental characteristics related to a target network cell and/or one or more neighboring network cells. Computations are performed to determine the MAR associated with the target network cell based on, for example, the position of the target network cell and/or the position of the one or more neighboring network cells. Additionally, other systems and methods are described herein.

DETAILED DESCRIPTION

Described herein are systems and methods for managing maximum antenna range (MAR) for one or more wireless communication network cells. Some example implementations use information about network cells in a cellular wireless communications network to determine a MAR for one or more target network cells. The information may be obtained from a network database that is constructed with data about the network cells. The network database may be updated with data from carriers, such as when a cell tower or base station is placed into service, and/or may be updated with data obtained from inspecting network operations. Some example implementations involve using data on network cells that can be obtained from estimating coverage of respective network cells in a terrestrial positioning system. Various examples of the systems and methods described herein may be implemented via a mobile device and/or a positioning server.

The maximum antenna range (MAR) for a target communication network cell may be set in accordance with various network parameters. The MAR may be set based on network topology parameters such as distances of the target network cell from other network cells or density of network cells around the target network cell. The MAR may be set based on population parameters such as density of network cells around the target network cell or number of users served by the target network cell or served by the network cells around the target network cell. The radio frequencies used by the target network cell may also be used to determine the MAR in accordance with a signal propagation model for the target network cell. By setting the MAR of the target network cell based on the above noted parameters, improved management and operation of the target network cell can be achieved.

Figure 1:
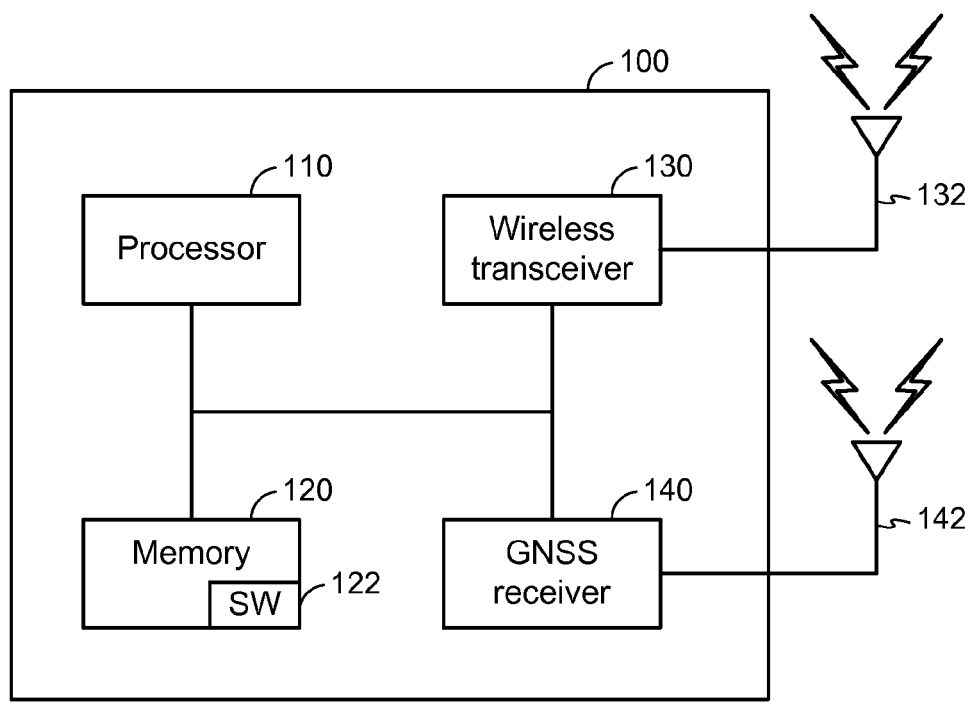
FIG. 1 is a block diagram of components of a mobile device.
Figure 2:
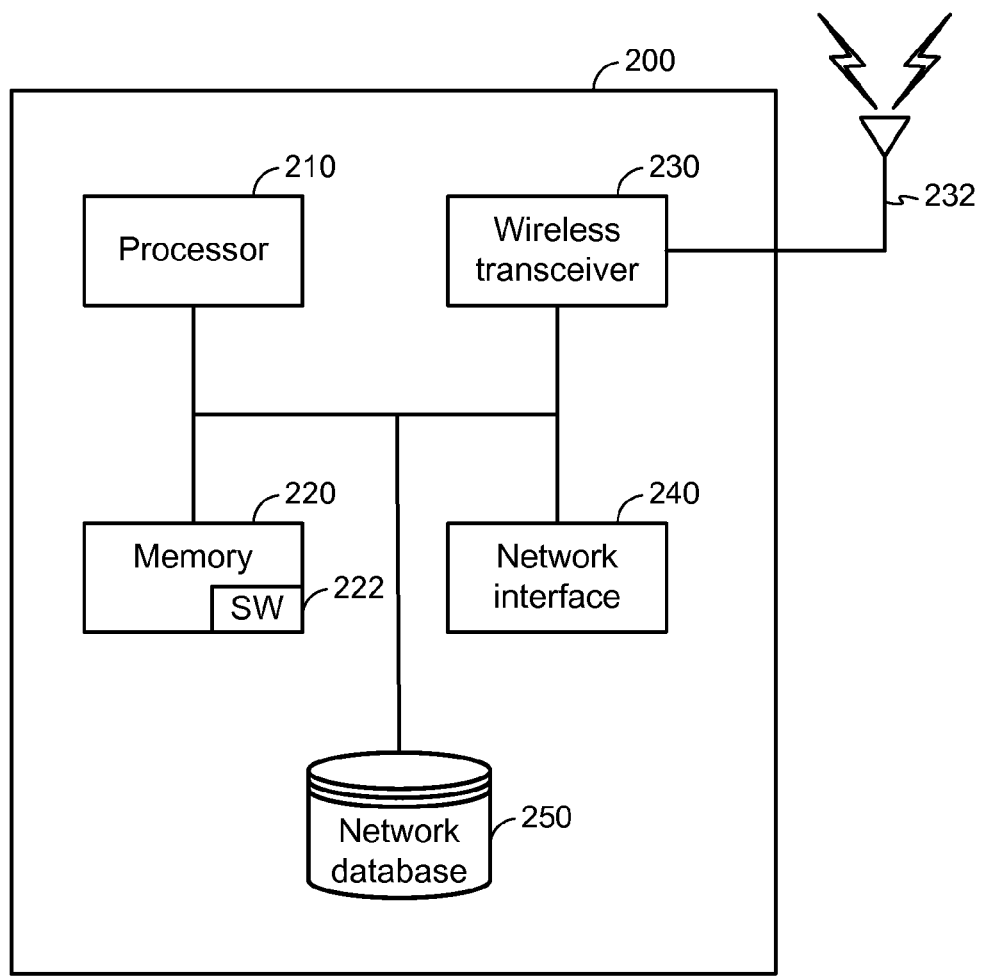
FIG. 2 is a block diagram of components of a positioning server.

An example of a mobile device 100 and an example of a positioning server 200 are shown in FIG. 1 and FIG. 2, respectively. With reference first to FIG. 1, the mobile device 100 includes a computer system including a processor 110, a memory 120 including software 122, a wireless transceiver 130 associated with an antenna 132, and a global navigation satellite system (GNSS) receiver 140 associated with a GNSS antenna 142. While the antenna 132 and the GNSS antenna 142 are each shown in FIG. 1 as a single antenna, the antenna 132 and/or the GNSS antenna 142 may include more than one antenna. Further, the antenna 132 of the mobile device 100 may also be operable to function as the GNSS antenna 142, or vice versa.

The processor 110 is preferably an intelligent hardware device, e.g., a central processing unit (CPU) such as those made or designed by QUALCOMM®, ARM®, Intel® Corporation, or AMD®, a microcontroller, an application specific integrated circuit (ASIC), etc. The processor 110 may comprise multiple separate physical entities that can be distributed in the mobile device 100. The memory 120 includes random access memory (RAM) and read-only memory (ROM). The memory 120 is a non-transitory processor-readable storage medium that stores the software 122, which is processor-readable, processor-executable software code containing processor-readable instructions that are configured to, when executed, cause the processor 110 to perform various functions described herein (although the description may refer only to the processor 110 performing the functions). Alternatively, the software 122 may not be directly executable by the processor 110 but configured to cause the processor 110, e.g., when compiled and executed, to perform the functions. Media that can make up the memory 120 include, but are not limited to, RAM, ROM, FLASH, disc drives, etc.

The wireless transceiver 130 is configured to communicate, via the antenna 132, bi-directionally with one or more entities of a communication system in which the mobile device 100 operates. In some implementations, the wireless transceiver 130 may support communication over a variety of communication systems, and the mobile device 100 may utilize the same antennas or different antennas for different communication systems.

The GNSS receiver 140 includes appropriate equipment for monitoring positioning signals from satellites and determining position of the mobile device 100. For example, the GNSS receiver 140 is associated with one or more GNSS antennas, here the GNSS antenna 142, and can either communicate with the processor 110 to determine location information or can be provisioned with a dedicated processor for processing the received satellite signals to determine the location of the mobile device 100. Further, the GNSS receiver 140 may be configured to communicate with other entities to send and/or receive assistance information for use in determining the location of the mobile device 100. The GNSS receiver 140 may be configured to receive satellite signals corresponding to one or more satellite systems such as the Global Positioning System (GPS), GLONASS, Compass, Beidou, and/or any other satellite systems either presently existing or developed in the future.

The mobile device 100 may be referred to as a user equipment (UE), mobile station, subscriber unit, terminal or access terminal (AT), etc. The mobile device 100 may be a cellular phone, wireless router, personal digital assistant (PDA), another handheld device, netbook, notebook computer, and/or any other device either presently existing or developed in the future that can use wireless communication.

Turning next to FIG. 2, the positioning server 200 includes a computer system including a processor 210, a memory 220 including software 222, a network database 250, a wireless transceiver 230 associated with an antenna 232, and a network interface 240. The processor 210, the memory 220, and the wireless transceiver 230 may be similar in structure to the corresponding components of the mobile device 100 but differ in functionality, e.g., via the software 222 including processor-executable instructions that are stored in the memory 220 and that are configured to cause the processor 210 to carry out functions of the positioning server 200. However, as the positioning server generally has a less-limited form factor and more access to power and other resources as compared to the mobile device 100, the components of the positioning server 200 may also differ structurally from those of the mobile device 100 to account for these differences. Further, while not shown in FIG. 2, one or more components of the positioning server 200 may be housed in a single device or distributed among a plurality of different devices. As shown, the positioning server 200 includes both the wireless transceiver 230 and the network interface 240, but other implementations of a positioning server may omit either the wireless transceiver 230 or the network interface 240.

The network interface 240 of the positioning server 200 includes a network transceiver and is configured to communicate with other network entities, such as network cells, other servers and/or control entities, other physical devices associated with the positioning server 200 (e.g., in a distributed arrangement), etc., via a backhaul link. The backhaul link may utilize any suitable wired or wireless (e.g., Wi-Fi, Bluetooth, microwave, etc.) communication technology or combination of technologies. For a wireless backhaul link, the network interface may be at least partially implemented by the wireless transceiver 230 to enable backhaul communications to be conducted via the antenna 232. The positioning server 200 may be implemented without the wireless transceiver 230 or the antenna 232. The network interface 240 may also be configured to establish communication links between the positioning server 200 and other networks or internetworks, such as the Internet.

The network database 250 is a structured storage facility that is organized for record search and access. The network database 250 is organized as a relational database with information stored in tables that can be referenced using one or more indexes. Information about network cells is stored in the network database 250, and may be added to, modified or removed in accordance with the configuration of the wireless communication network cells. Other types of data structures and configurations can be used to store the network cell information. Information stored in the network database 250 may include information relating to positions of respective sites in a wireless wide area network (WWAN), such as network cells or base stations, wireless access points, positioning beacons, or the like.

Figure 3:
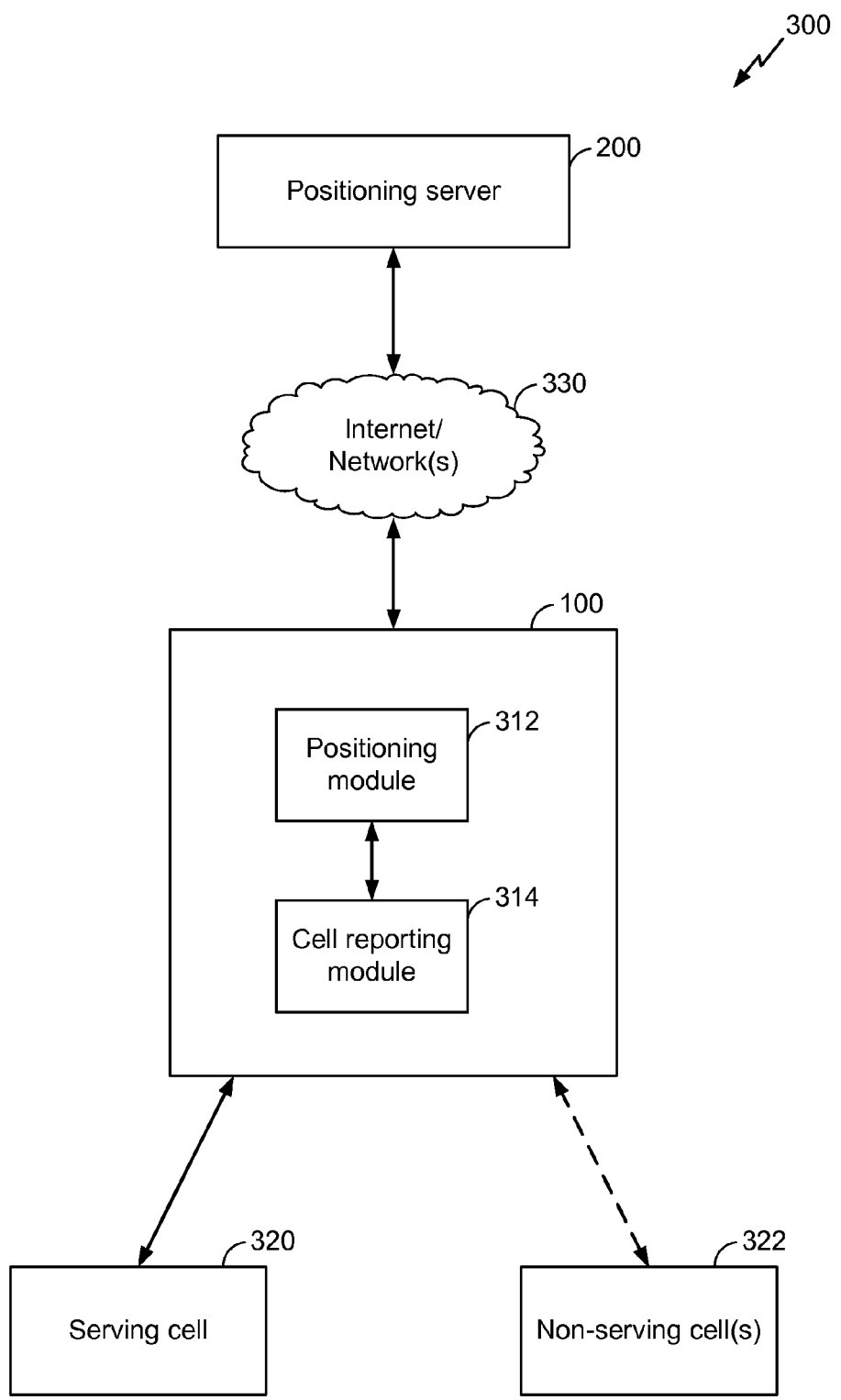
FIG. 3 is a block diagram of a wireless communication system that includes the mobile device shown in FIG. 1 and the positioning server shown in FIG. 2.

FIG. 3 illustrates an example of a terrestrial positioning system 300 (hereinafter referred to as "the system 300" for brevity) in which the mobile device 100 and positioning server 200 operate. The system 300 includes the mobile device 100 illustrated by FIG. 1 and the positioning server 200 illustrated by FIG. 2 in addition to a serving cell 320 and one or more non-serving cells 322. The cells 320, 322 include wireless transceivers (not shown) and are positioned within an area associated with the mobile device 100. The cells 320, 322 may provide communication service for a surrounding area. The communication service offered by the cells 320, 322 may be selectively provided for one or more devices in the surrounding area, which may or may not include the mobile device 100, based on access restrictions, loading restrictions or other factors. Here, the mobile device 100 receives service from the serving cell 320, and an additional non-serving cell 322 is located proximate to the mobile device 100. Additionally, while not illustrated in FIG. 3, the system 300 may also include location beacons and/or other devices that broadcast location-related information but do not provide communication service. Further, while FIG. 3 and the description herein refer specifically to a cellular communication network, other transceivers, such as Bluetooth short-range wireless communication technology transceivers, Wi-Fi access points, or the like, may be used in addition to, or in place of, the cells 320, 322.

The mobile device 100 is capable of communication with the positioning server 200 via one or more networks or internetworks, such as the Internet 330. The mobile device 100 may communicate over the Internet 330 via a connection between the mobile device 100 and the Internet 330 that is established via the serving cell 320 and/or other suitable network communication providers.

As stated above, the mobile device 100 is configured to receive communication service via the serving cell 320. In addition, a positioning module 312 of the mobile device 100 maintains an estimated position of the mobile device 100. The positioning module 312 may operate regularly, e.g., according to a schedule, and/or in response to a prompt from an application residing on the mobile device 100, the positioning server 200, and/or any other entity in the system 300 that is authorized to obtain the position of the mobile device 100. The positioning module 312 may be configured to operate in a plurality of modes that include at least a reporting mode and a terrestrial positioning mode. In the reporting mode, the positioning module 312 operates in combination with a cell reporting module 314 to obtain the position of the mobile device 100, e.g., via the GNSS receiver 140 and/or other components of the mobile device 100 that are able to obtain an estimated position of the mobile device 100 without reference to the respective cells 320, 322 of the system 300, and to report the position of the mobile device 100 along with the identity of the serving cell 320 to the positioning server 200. The position of the mobile device 100 may be expressed as latitude/longitude coordinates and/or any other manner suitable for indicating the position of the mobile device 100 with reference to the earth or a region thereof.

The positioning server 200 utilizes network cell information provided by the mobile device 100 and other device(s) in the system 300 to contribute to the network database 250 or other data structure. When operating in the terrestrial positioning mode, the mobile device 100 can obtain a coarse estimate of its position by identifying the serving cell 320 with which it is associated and setting the position of the mobile device 100 to the position of the serving cell 320 as indicated by the information for the serving cell 320 stored in the network database 250 in positioning server 200. Similar to conventional cell ID positioning, a position estimate obtained in this manner has a range of uncertainty that is approximately equal to the coverage area of the associated network cell, which is in turn defined by a maximum antenna range (MAR) of the cell. Unlike conventional cell ID positioning, however, the mobile device 100 stores a list of various network cells (e.g., commonly used cells, cells located in the same city and/or other geographic region as the mobile device, etc.) and determines its position based on this information, only requesting new cell data from the network upon encountering a new network cell and/or upon the satisfaction other limited triggering conditions. Thus, the mobile device 100 may engage in positioning without engaging any specialized software or requesting positioning data from the network.

As noted above, a terrestrial positioning system utilizes crowdsourced cell information based on mobile uploads. The positioning server 200 assigns an estimated coverage area for the cell that can be stored in the network database 250. Here, the estimated coverage area is a substantially circular area having a radius defined by the MAR for the cell, although other coverage area configurations may be used. The MAR is determined in view of the requirements of devices utilizing the terrestrial positioning system. For instance, setting an MAR to be too large for a given cell can result in excessive GNSS search times and/or other delays in obtaining a position, and conversely, setting the MAR too small may result in errors due to the actual position of a requesting device not being within the area defined by the MAR.

In view of the above, the coverage radius or MAR for a crowdsourced cell can be set to a default value by the positioning server 200. The default MAR is defined in order to reduce positioning error rates while also reducing the amount of time taken for positioning for a typical network deployment. For instance, the default MAR may be approximately 23 km for a cellular communication network. Other values may also be used.

Alternatively, the MAR for a given network cell can be dynamically assigned and/or adjusted using a MAR-by-density (MBD) algorithm. An MBD algorithm can use factors such as network topology and/or population density to contribute to building a representative positioning network as crowdsourced data is collected by the positioning server 200.

Figure 4:
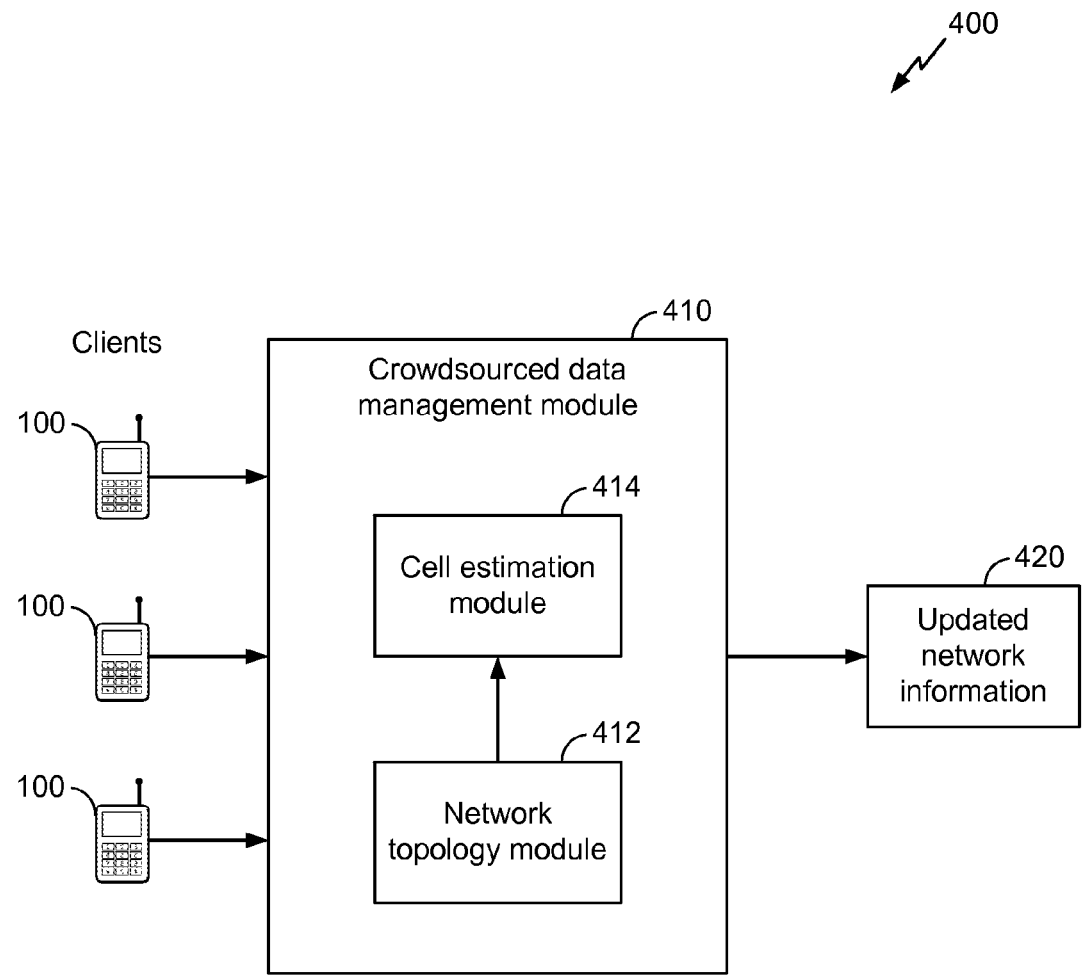
FIG. 4 is a block diagram of a system that supports crowdsourced updates to network cell information for the communication system shown in FIG. 3.

FIG. 4 illustrates a system 400 for setting the MAR of a newly crowdsourced cell based on existing network topology. While the discussion below pertains to a cellular communication network, similar concepts may be applied to other crowdsourced networks, such as Wi-Fi networks or femto networks. The system 400 includes a crowdsourced data management module 410 configured to receive data associated with network cells from mobile devices 100, which may be client devices for the network cells. Here, the crowdsourced data management module 410 may be implemented as the positioning server 200, e.g., as hardware, combinations of hardware, firmware and/or software, such as may be obtained via the software 222 stored on the memory 220 executed by the processor 210. Other implementations may also be used.

As described above, the mobile devices 100 are configured to upload information pertaining to the identity and location of network cells to the positioning server 200. Here, the crowdsourced data management module 410 obtains these data and initially determines whether the received data includes newly crowdsourced cells. To make this determination, a network topology module 412 associated with the crowdsourced data management module 410 analyzes the incoming data to determine whether the data indicate the presence of a new (or, in some cases, moved and/or otherwise altered) network cell. For example, the crowdsourced data management module 410 accesses and inspects records from the network database 250 and compares the record information against the incoming data from the mobile devices 100 to determine whether the serving cell 320 or the non-serving cell(s) 322 are represented in the record information. If the analysis indicates that the network cell is an existing network cell, the crowdsourced data management module 410 makes a determination whether to adjust the MAR of the existing network cell. If the analysis indicates that the network cell is a new network cell, the crowdsourced data management module 410 makes a determination that the MAR of the new network cell should be set. A determination that the MAR of the network cell, whether existing or new, should be set or adjusted causes execution of one or more of the techniques described below for determining a MAR. In addition, or alternatively, the network topology module 412 operates in combination with a cell estimation module 414 to assign a coverage area, e.g., MAR, to the network cell. In some implementations, a newly crowdsourced cell is initially assigned a coverage area according to a default MAR and subsequently adjusted as new data are received from the mobile devices 100. In other implementations, the cell estimation module 414 determines the initial MAR for a newly crowdsourced cell based on the network topology of the area surrounding the newly crowdsourced cell, as given by the network topology module 412. The network topology module 412 may access information from the network database 250 that can contribute to determining the network topology of the area. For example, the network database 250 includes locations of wireless devices such as network cells, base stations, wireless access points or positioning beacons. A topology defined by the location and type of one or more of these wireless devices can be used to determine a topology that includes the newly crowdsourced cell. Techniques for assigning an initial MAR to a network cell, and/or for adjusting the MAR of an existing network cell, are discussed below. Upon creating or adjusting information corresponding to the network cell, resulting updated network information 420 is stored, for example in the network database 250. The updated network information 420 may also be provided to respective mobile devices 100 for positioning operations.

Figure 5A:
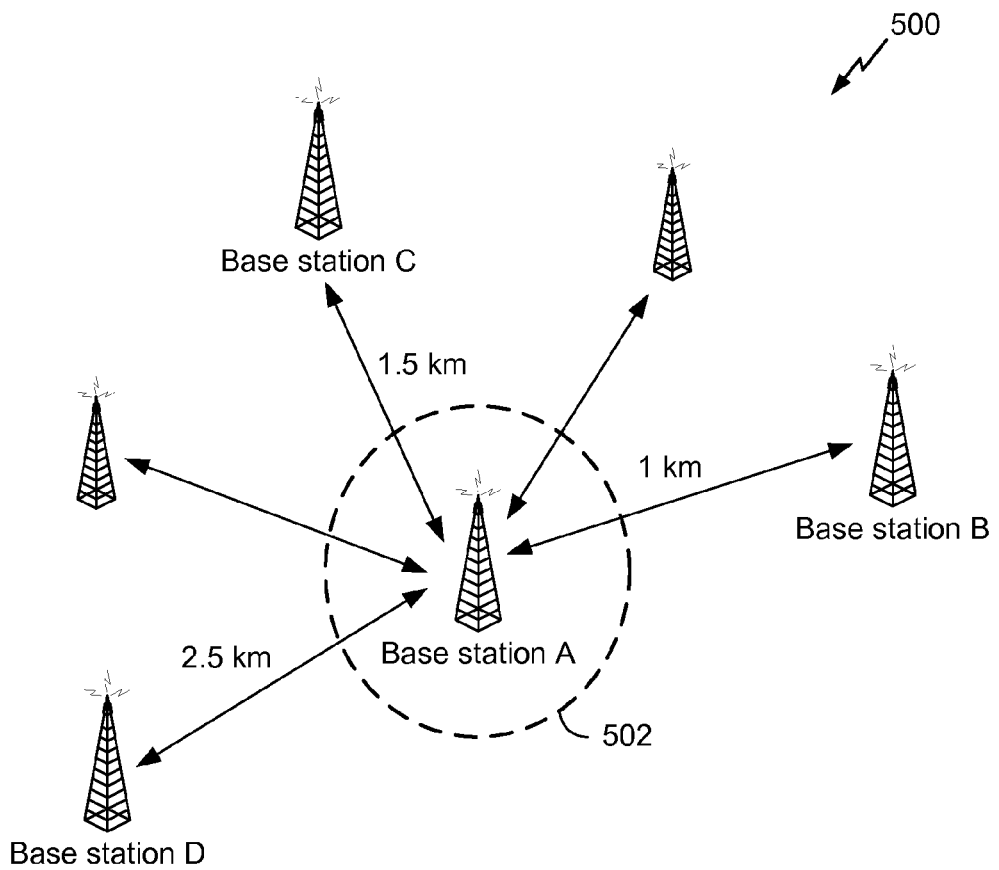
FIGS. 5A-5B are illustrative views of respective cell estimation operations performed by the system shown in FIG. 4.

The crowdsourced data management module 410 utilizes network topology, and/or other information, to assign a MAR to a network cell that defines an estimated coverage area that approximates the coverage area of the cell for purposes of communication. Referring also to FIG. 5A, diagram 500 illustrates an example MAR assignment 502 that can be established by the crowdsourced data management module 410 for a base station A that is proximate to several other base stations, e.g., in an urban environment. Diagram 500 is intended to be a generalized diagram corresponding to an example communication network and is not drawn to scale relative to the diagram as a whole or to individual elements therein.

The network topology module 412 initially obtains data corresponding to base station A from, for example, the network database 250 or the mobile devices 100 and, from these data, determines that base station A corresponds to a new network cell or a network cell for which the MAR is to be adjusted. The network topology module 412 then computes a position estimate for base station A based on the positions reported by the mobile devices 100 that indicated base station A as a serving cell. Alternatively, or in addition, the network topology module 412 computes a position estimate for base station A based on a position reported by the network database 250. This initial positioning may be done based on any suitable techniques for base station positioning as generally known in the art. Further, the network topology module 412 may be configured to remove or otherwise account for outlier positions that, e.g., do not fall within a threshold distance of other reported positions for base station A.

Upon obtaining a position estimate for the base station A, the network topology module 412 locates network cells that neighbor the base station A. The location of network cells that neighbor the base station A can be obtained from information previously stored in the network database 250, or from information reported by the mobile devices 100, for example. The network topology module 412 selects the network cells that neighbor the base station A to be used in the MAR determination. The selection of the neighboring network cells can be limited or filtered based on such parameters as distance from base station A, the type of neighboring network cell, the MAR of the neighboring network cell, or other parameters that can be used to identify neighboring network cells that can be used in the calculation of the MAR for the base station A. The diagram 500 in FIG. 5A illustrates the selection of base stations B, C and D as neighboring network cells, and determines their distance from the base station A. The distance of the base stations B, C and D from the base station A can be determined based on the respective locations of the base station A and the base stations B, C and D. As noted above, the location of the base station A may be known, or may be estimated based on information reported by the mobile devices 100. Based on the distances of the base stations B, C and D from the base station A, the cell estimation module 414 utilizes a density algorithm and/or other suitable algorithms as described below to estimate and/or determine the MAR of the base station A.

In some implementations, the cell estimation module 414 is configured to estimate the MAR of the base station A as a function of the distances between the base station A and at least one neighboring base station. For instance, the cell estimation module 414 may determine the MAR of the base station A using the distance to the nearest identified base station from the base station A. As illustrated in the diagram 500, the base station B is identified as the nearest base station with a distance of 1 km, and is therefore selected to be used in the calculation of the MAR for the base station A. According to an example implementation, the cell estimation module 414 uses the distance between the base station B and the base station A, and applies a scaling factor to the distance between the two base stations. Thus, the cell estimation module 414 may set the MAR of the base station A to be x km, where x is the scaling factor. The scaling factor x may be a uniform, constant value, or alternatively may be dynamically adjusted based on properties of nearby network cells and/or other factors. Lower and upper limits may be placed on the scaling factor to bound the MAR value that can be set. If the scaling factor x is configured to be variable, it may be adjusted based on factors which may include, but are not limited to, the following.

Characteristics of the local propagation environment—The scaling factor may increase or decrease in proportion to the network density of the surrounding area. For instance, a first scaling factor (e.g., 3) may be applied for a target cell in a dense urban area and increased as the network density decreases. Adjustment of the scaling factor for network density may be substantially continuous or based on pre-defined setpoints, e.g., a first scaling factor for an urban area, a second scaling factor for a suburban area, a third scaling factor for a rural area, etc.

Cell signal frequency—The scaling factor may be adjusted based on the signal frequency(-ies) utilized by the target cell, e.g., by adjusting the scaling factor downward as the signal frequency increases, and vice versa. Similar to the above, adjustment of the scaling factor based on cell signal frequency may be performed substantially continuously and/or based on a series of frequency steps.

Cell antenna properties—The scaling factor may also be adjusted based on characteristics of the antennas of the target cell, such as antenna altitude (with respect to sea level and/or the surrounding terrain), antenna directions and/or opening angle, or the like.

Characteristics of neighboring cells—Various characteristics of network cells that are near the target cell may also cause adjustment to the scaling factor. These characteristics include neighbor cell signal frequency and/or communication range, presence or absence of neighboring cells associated with other network carriers (e.g., roaming partners), etc. For instance, if MARs are known for respective network cells located near the base station A, the scaling factor can be adjusted downward if the surrounding cells have relatively high MARs (e.g., an average, maximum, and/or other function of the MARs of the surrounding cells being greater than a threshold value). Similarly, the scaling factor can be adjusted upward if the surrounding cells have relatively low MARs.

Cell usage level—The scaling factor associated with a given cell may also be configured to change over time according to the loading and/or usage of the cell. For instance, if a cell is heavily loaded, which may be the case at a high-traffic tourist attraction or during sporting and/or other events, MAR scaling may be reduced or omitted. Conversely, a lightly loaded cell may result in increased MAR scaling.

Cell/network radio access technology (RAT)—Differences in RATs utilized by respective cells in an area, or changes to the RATs over time (e.g., due to network evolution, etc.) may also impact the scaling factor for a given cell. For instance, the deployment of LTE radio technology in an area may lead to an adjustment in the scaling factor of legacy GSM cells. The scaling factor adjustment may reduce the MAR of legacy GSM cells where LTE capable cells are deployed within a threshold distance, for example.

While the diagram 500 shows the example MAR assignment 502 for a network cell based on the distance to one other network cell, other techniques for setting the MAR may also be used. For instance, a combined metric based on distances between the target cell and multiple other cells, such as an average or weighted average distance, may also be used. Further, respective neighboring cells may be added or omitted from the MAR calculation based on tower health (e.g., by reducing a weight associated with a given cell tower or omitting the cell tower from computations if the tower is on maintenance and/or malfunctioning) or other factors. Additionally, or alternatively, the scaling factor and/or the MAR for a given network cell may be adjusted according to other criteria, such as adjacency of the cell to roads and/or large venues, cell type (e.g., macro cells, femto cells, repeaters, etc.), antenna direction and/or opening angle, or the like. Other metrics may also be used.

Figure 5B:
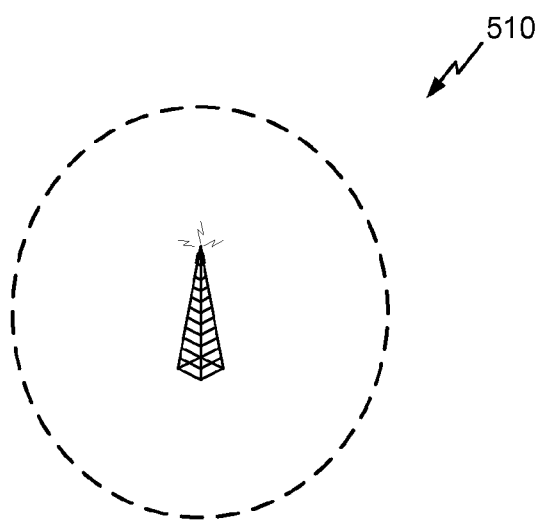

As described above with respect to diagram 500, the crowdsourced data management module 410 leverages information associated with network cells that are proximate to a target network cell, which may be a new network cell, to determine an adjusted MAR for the cell. Alternatively, or in addition, if a network cell has no or few neighbors within a threshold distance of the cell, the cell may be initially assigned a default MAR. This default MAR assignment is illustrated by a diagram 510 in FIG. 5B. Subsequently, as additional information relating to the cell or its surrounding cells is received, the MAR assigned to the cell may be adjusted. Adjustment of the MAR may be performed, for example, by modifying the existing MAR, modifying the scaling factor or by calculating a new MAR for the cell as described generally herein, e.g., with respect to the diagram 500.

In an example process, the example MAR assignment 502 determined by the crowdsourced data management module 410 based on density of users and/or network cells. A crowdsourced network cell, including newly crowdsourced network cells, can be processed based on sectors of the network cell that are ignored. For example, a cell tower may have antennas removed that represent sectors of coverage for the cell tower. The crowdsourced data management module 410 determines which sectors to ignore by comparing cell tower distance to a minimum tower separation distance. Antennas within the minimum tower separation distance are ignored for purposes of determining density of users and/or network cells, including determining a network so that is a nearest neighbor. The minimum tower separation distance can be fixed or dynamic, and may be switched between several values depending on cell tower configuration. For example, sector antennas for the same tower may be greater than 150 meters apart, and the minimum tower separation distance is set to be greater than the distance to the sector antennas, so that the sector antennas are not considered to be a neighboring network cell. The crowdsourced data management module 410 may also calculate sector center coordinates to be used as the location for the crowdsourced network cell. The sector center coordinates may be stored by the positioning server 200, for example, and the network database 250.

Figure 6:
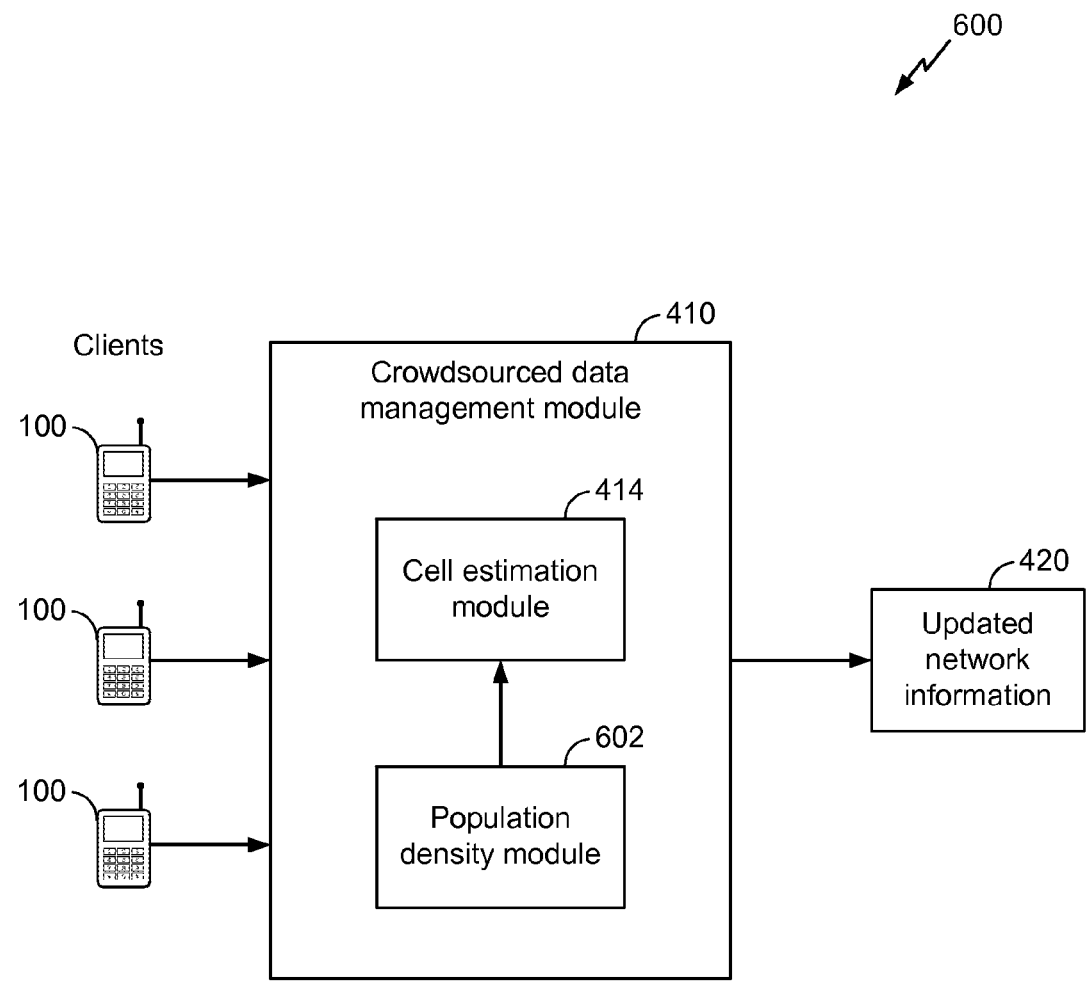
FIGS. 6-7 are block diagrams of systems that may be used in addition to or in place of the system shown in FIG. 4, for updating network cell information.

In addition to, or in place of, network topology, the crowdsourced data management module 410 may also utilize other information in determining a MAR for a target network cell, including determining a MAR for new network cells. For instance, FIG. 6 illustrates a system 600 in which the crowdsourced data management module 410 utilizes a population density module 602 to estimate the MAR of a target network cell based on network and/or user density in an area surrounding the target network cell. The population density module 602 may operate similarly to the network topology module 412 such that, for instance, the calculated MAR of a target network cell is inversely proportional to the amount of network cells that neighbor the target network cell (i.e., more neighboring network cells results in a lower MAR, and vice versa). Additionally or alternatively, the population density module 602 may determine the MAR of a target network cell based on user density within the target network cell, which may be determined via a number of reports received for the target network cell and/or by analyzing network usage data. For example, the more users that are identified within a given area covered by the target network cell, the smaller the MAR that may be used. The density of users may also be determined based on the number of users served by one or more network cells that neighbor the target network cell. Such a determination may be made using a number of reports received for the neighboring cell(s) and/or by analyzing network usage data to detect user population density in a given area that includes the target cell and one or more neighboring cells.

Figure 7:
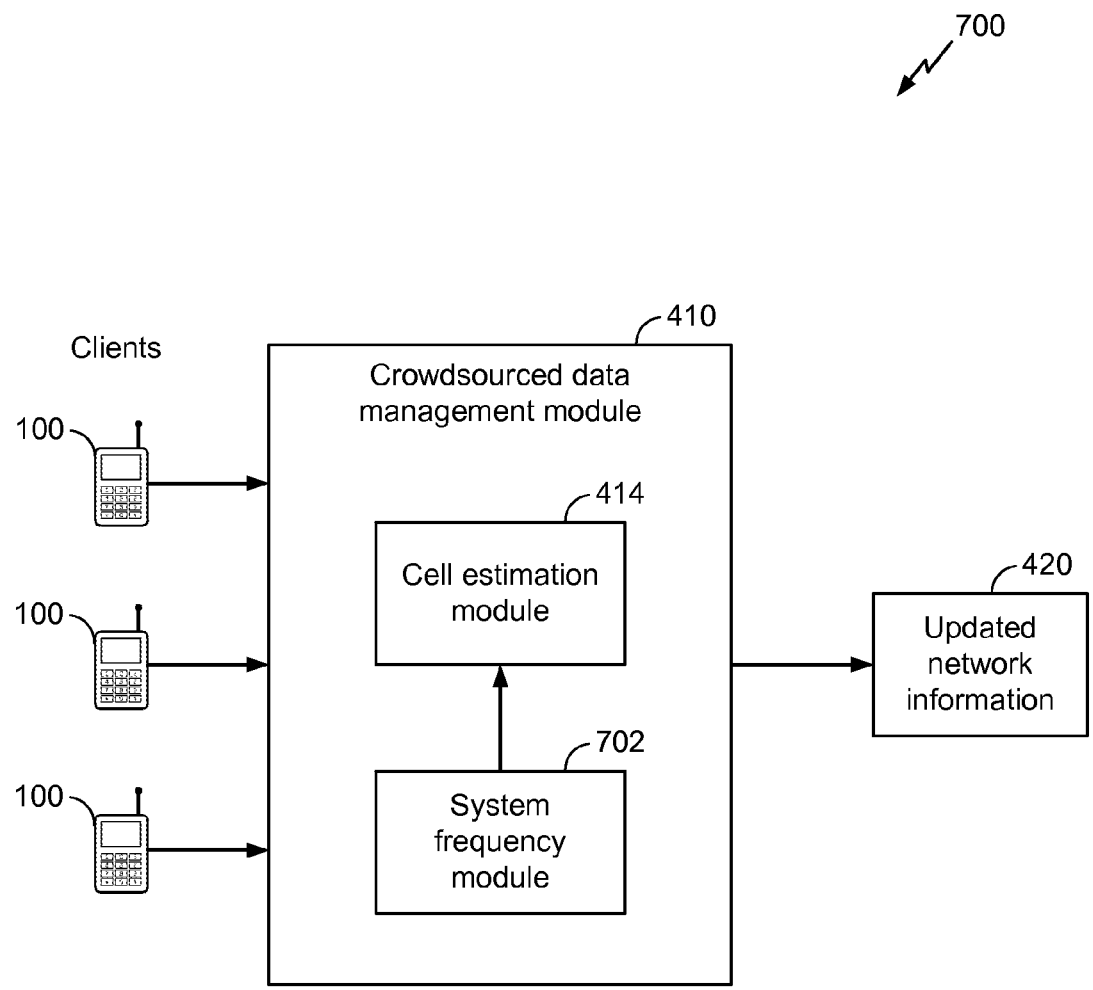

FIG. 7 illustrates a system 700 in which the crowdsourced data management module 410 utilizes a system frequency module 702, either independently of or in combination with the network topology module 412 (not shown in FIG. 7), to estimate the MAR of a target network cell based on the system frequencies utilized by the target network cell and/or neighboring network cells. For instance, based on the system frequency of a target network cell, the system frequency module 702 may adjust the MAR of the target network cell using a signal propagation model that accounts for signal fading and other factors. Higher system frequency such as, for example, 1.9 GHz, provides a shorter carrier signal that tends to travel in a straight-line propagation with less influence by curvature of the earth. Lower system frequency such as, for example, 400 MHz, provides a longer carrier signal that tends to travel in a curved propagation path that curves with the curvature of the earth. The cell estimation module 414 may thus set the MAR to be smaller for a higher system frequency than the MAR that is set for a lower system frequency, as indicated by the system frequency module 702. Also or alternatively, the system frequency module 702 may take the system frequencies of neighboring network cells into account in estimating the MAR of the target network cell.

Figure 8:
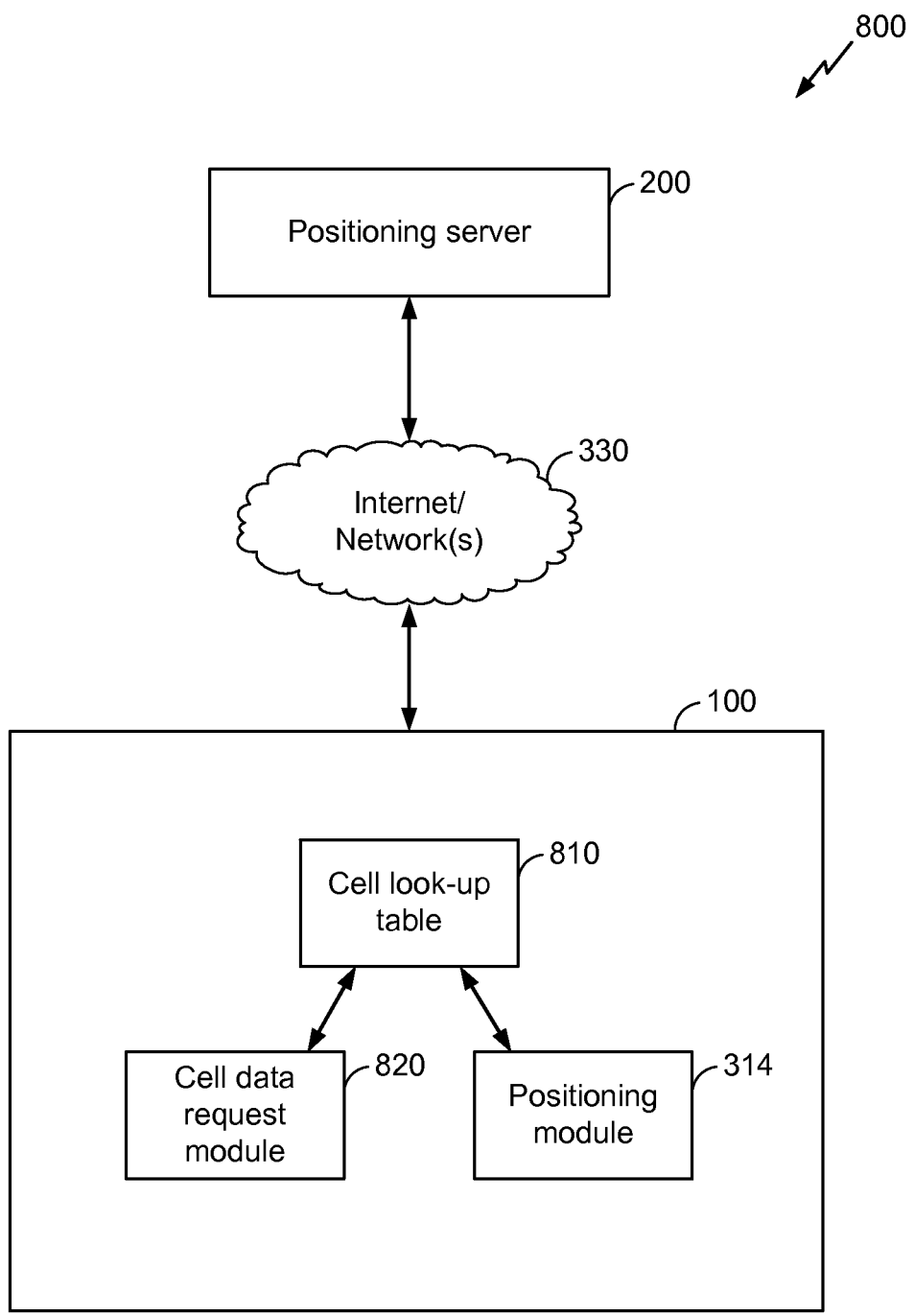
FIG. 8 is a block diagram of a system for utilizing crowdsourced network cell information to estimate a position of a mobile device.

Coverage area data obtained and stored by the positioning server 200 as described above is subsequently used for positioning by the mobile device 100 as shown by a system 800 in FIG. 8. Here, the mobile device 100 identifies the serving cell 320 (FIG. 3) and analyzes a cell look-up table 810, locally stored in the mobile device 100, for location data associated with the serving cell 320. The cell look-up table 810 contains a subset of the network cell records maintained in the network database 250 by the positioning server 200. The cell look-up table 810 may contain records for network cells in which the mobile device 100 is likely to be located, e.g., frequently used cells, cells in a particular geographical region (city, state, country, etc.) in which the mobile device 100 is located, etc., and/or other records.

If the cell look-up table 810 contains a record corresponding to the serving cell, the mobile device 100 sets its position to the position of the serving cell as indicated by the cell look-up table 810. If the cell look-up table 810 does not contain a record for the serving cell 320, the mobile device 100 utilizes a cell data request module 820 to request additional network cell information from the positioning server 200. The cell data request module 820 may be implemented by the wireless transceiver 130 and/or any other suitable components of the mobile device 100. Further, the request may be made to the positioning server 200 directly or indirectly, e.g., via the Internet 330.

In response to the request, the positioning server 200 checks stored network information, such as may be stored in the network database 250, and determines whether information corresponding to the serving cell 320 for the mobile device 100 is available. If so, the positioning server 200 sends this information to the mobile device 100, and the mobile device 100 updates the cell look-up table 810 accordingly. The information sent by the positioning server 200 may correspond to only the serving network cell, an area (e.g., a "tile" or other geographical region) that includes the serving cell, or both.

The mobile device 100 may also utilize information corresponding to cells other than the serving cell 320 in obtaining a position for the mobile device 100. For instance, information corresponding to neighboring cells can be used in combination with information for the serving cell 320 to calculate an estimated position of the mobile device 100 based on averaging or weighted averaging, e.g., via mixed cell sector positioning and/or other techniques known in the art. Other information, such as ranging estimates, received signal strength indications, or the like, may also be used by the mobile device 100 in determining its position.

The mobile device 100 may also obtain its position via the positioning module 312 as described above and report this position to the positioning server 200. The position report may be done at scheduled intervals and/or by request of the positioning server 200, e.g., in the event that the mobile device 100 requests information for a network cell that is not known to the positioning server 200.

By maintaining a local set of network cell information at the mobile device 100, the mobile device 100 can obtain a coarse estimate of its position with reduced engagement with the positioning server 200 and/or other network entities. In some cases, the mobile device 100 may utilize the cell look-up table 810 without requiring updates for significant amounts of time absent environmental changes such as long-distance travel or network topology changes.

In the event of a handoff of the mobile device 100 from a source cell to a destination cell, similar techniques to those described above may be used by the mobile device 100 to update its position. For instance, the mobile device 100 may update its estimated position to the position of the new serving cell. Alternatively, or in addition, the mobile device 100 may utilize an alternative estimated position, such as the position of the serving cell 320 or a midpoint or some other point between the serving cell 320 and destination cells and/or other nearby cells, for some interval of time prior to and/or following a handoff. Other ways of updating the position of the mobile device 100 during a handoff are also possible.

Figure 9:
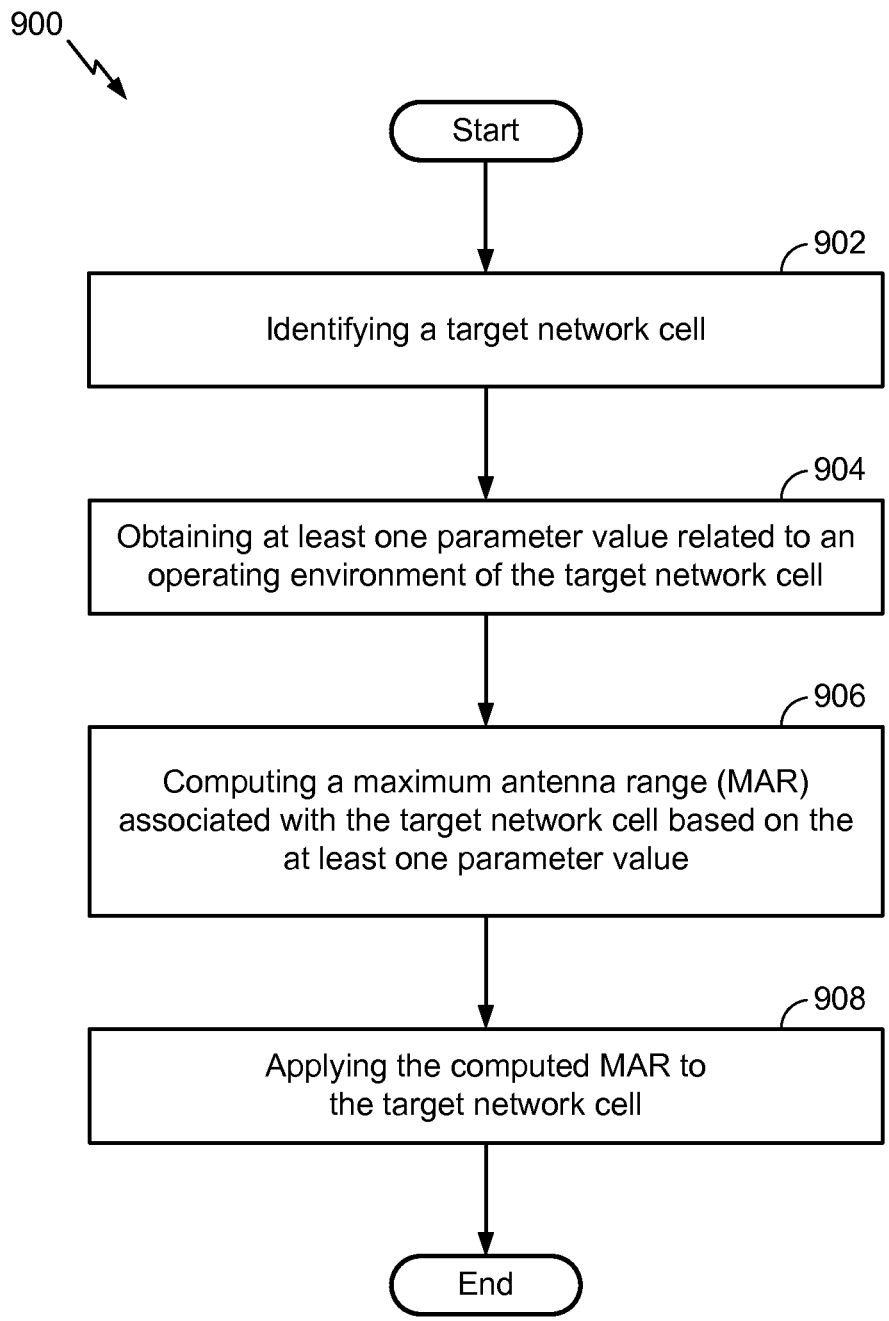
FIG. 9 is a block flow diagram of a process for estimating network cell coverage based on crowdsourced information.

Referring to FIG. 9, with further reference to FIGS. 1-8, a process 900 of initializing a positioning beacon in a wireless communication system includes the stages shown. The process 900 is, however, an example only and not limiting. The process 900 can be altered, e.g., by having stages added, removed, rearranged, combined, and/or performed concurrently. Still other alterations to the process 900 as shown and described are possible.

A block 902 illustrates a stage for identifying a target network cell, e.g., the serving cell 320 for the mobile device 100. For example, the mobile device 100, the positioning module 312, the network topology module 412, the population density module 602, the system frequency module 702 and/or the positioning server 200 may identify the target network cell. The target network cell may be identified based on being a newly deployed network cell, and/or may be identified as part of an initialization process that is implemented to configure the target network cell. Another network cell, such as a neighboring network cell, may identify the target network cell for MAR setup or adjustment. One or more of the mobile devices 100 may also or alternatively identify the target network cell. The identified target network cell is processed for MAR setup or adjustment.

A block 904 illustrates a stage for obtaining at least one parameter value indicative of an operating environment of the target network cell. The parameter value indicates a characteristic of the operating environment as opposed to being a consequence of characteristics of the operating environment, such as an intensity of a signal from the target network cell at a certain position or distance from the transceiver. The positioning server 200 may obtain the at least one parameter value, for example, from a record maintained in the network database 250 for the target network cell or for one or more neighboring network cells. The positioning server 200 may maintain records in the network database 250 that include network cell information about existing or newly added network cells and/or information about a network cell provided by the mobile device 100. The parameter value is indicative of one or more features regarding network topology, population density, and/or target network cell transmission frequency. The parameter value may be one or more of: a position of the target network cell or of one or more neighboring network cells; a density of network cells around the target network cell; a number of users of the target network cell or one or more neighboring network cells; a carrier frequency of the target network cell or of one or more neighboring network cells; or any other network cell information that might be usable to contribute to setting or adjusting the MAR of the target network cell. The at least one parameter value may be obtained from the target network cell, one or more neighboring network cells, one or more of the mobile devices 100, the network database 250, or any other suitable source. In addition, or alternatively, the positioning server 200 may generate the at least one parameter value, and may employ, for example, the mobile device 100, the positioning module 312, the network topology module 412, the population density module 602 and/or the system frequency module 702 to generate and/or obtain the at least one parameter value. The positioning server 200 may, for example, employ the network topology module 412 to determine a set of nearest neighboring network cells and their distances from the target network cell.

A block 906 illustrates a stage for determining a MAR associated with the target network cell based on the at least one parameter value. The positioning server 200 may determine the MAR, and may employ the crowdsourced data management module 410, including the network topology module 412, for some or all computations. The MAR may be determined based on any of the information or techniques described above or based on any other information or techniques. For example, the MAR may be determined based on a distance to a neighboring network cell, such as a nearest neighboring network cell. The distance may be multiplied by a scaling factor to increase or decrease the MAR that is used for the target network cell. The MAR may be determined based on density of network cells in an area that may or may not include the target network cell. The MAR may be determined based on a number of users served by the target network cell. The number of users may be determined based on usage records that may be stored in network database 250 or in a network cell. The number of users may be estimated based on usage activity during a given interval of time or based on connection signals received at the target network cell and/or one or more neighboring network cells, or based on other factors. The MAR may be determined based on radio frequencies used by the target network cell and/or neighboring network cells. The radio frequencies used may be applied to a signal propagation model to determine possible cell coverage for the target network cell and/or neighboring network cells. In addition, or alternatively, the MAR may be determined to be a default value, such as a maximum or nominal value. The MAR may be determined based on position information related to the target network cell, one or more neighboring network cells and/or one or more mobile devices, or other positioning information. The MAR may be determined based on network topology, including topology configuration of the nearest neighboring network cells that neighbor the target network cell. The positioning server 200 and/or the network topology module 412 may determine a MAR for the target network cell based on network topology, and the determined MAR may provide coverage for an area that includes zero, one or a number of neighboring network cells located around the target network cell.

A block 908 illustrates a stage for applying the determined MAR to the target network cell. The positioning server 200 may instruct the target network cell to set the MAR to the determined value. The MAR is applied to the target network cell to set the coverage area for the target network cell. Setting or adjusting the MAR for the target network cell can reduce or increase the number of mobile devices 100 that can use the target network cell. Setting or adjusting the MAR for the target network cell can contribute to balancing loading of the target network cell and/or one or more neighboring network cells. Setting or adjusting the MAR for the target network cell may also be used to prompt setting or adjusting of the MAR for one or more neighboring network cells. A group of network cells can be identified for one or more iterations of MAR setting or adjusting. The MAR may be set or adjusted dynamically, e.g., as conditions or the configuration of the cellular communication network changes. For example, once the MAR of a given target network cell is set or adjusted, a process to set or adjust the MAR of one or more neighboring network cells can be initiated. The process for setting or adjusting the MAR of network cells can be distributed throughout a set of network cells, and changes to the MAR of one or more network cells can trigger the process for setting or adjusting the MAR for one or more other network cells. Other events can be used to trigger the MAR setting or adjustment process, including commands from a user or operator and/or events such as the occurrence of certain times and/or dates, the bringing online or initializing a network cell or antenna, including a new network cell or antenna, the density of network cells in a given region reaching a certain threshold, a number of users being served by the target network cell and/or by one or more neighboring network cells reaching a certain threshold, a change in carrier frequency of a network cell, or any other events.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

While various implementations described above may refer to network elements and/or utilize nomenclature specific to one or more network technologies, the techniques described herein are not intended to be limited to a specific technology and may be applied to any suitable technology or combination thereof, whether presently existing or developed in the future.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" or "one or more of" indicates a disjunctive list not requiring one of each item in the list such that, for example, a list of "at least one of A, B, or C," or a list of "one or more of A, B, or C," means A or B or C or AB or AC or BC or ABC (i.e., A and B and C), or combinations with more than one of the same feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method comprising:
   identifying a target network cell;
   obtaining at least one parameter value indicative of network topology, or population density, or target network cell transmission radio frequency, or a combination thereof, of the target network cell;
   determining a maximum antenna range (MAR) associated with the target network cell based on the network topology, or the population density, or the target network cell transmission radio frequency, or the combination thereof, indicated by the at least one parameter value; and
   applying the MAR to the target network cell.

2. The method of claim 1, wherein determining the MAR is based on:
   a distance between the target network cell and a neighboring network cell;
   a density of neighboring network cells;
   a number of users served by the target network cell; or
   a radio frequency used by the target network cell in accordance with a signal propagation model; or
   a combination thereof.

3. The method of claim 1, further comprising obtaining network cell information relating to a neighboring network cell that neighbors the target network cell, wherein determining the MAR is further based on the network cell information.

4. The method of claim 1, further comprising calculating a distance between the target network cell and a neighboring network cell that neighbors the target network cell, wherein determining the MAR is further based on the distance multiplied by a scaling factor.

5. The method of claim 1, further comprising setting the MAR to a default value when a number of neighboring network cells is less than a threshold value.

6. The method of claim 1, further comprising obtaining, from one or more client devices, position information related to the one or more client devices or the target network cell or a combination thereof.

7. The method of claim 1, wherein the at least one parameter value includes position information associated with the target network cell or one or more neighboring network cells.

8. The method of claim 1, further comprising initiating a process to set the MAR upon detecting an event.

9. The method of claim 1, wherein determining the MAR is based on a signal propagation model that accounts for signal fading.

10. A positioning server comprising:
a memory configured to store instructions; and
a processor configured to execute the instructions, wherein the instructions, when executed by the processor, cause the processor to:
identify a target network cell;
obtain at least one parameter value indicative of network topology, or population density, or target network cell transmission radio frequency, or a combination thereof, of the target network cell;
determine a maximum antenna range (MAR) associated with the target network cell based on the network topology, or the population density, or the target network cell transmission radio frequency, or the combination thereof, indicated by the at least one parameter value; and
apply the MAR to the target network cell.

11. The positioning server of claim 10, wherein the instructions are further configured to cause the processor to:
determine the MAR based on:
a distance between the target network cell and a neighboring network cell;
a density of neighboring network cells;
a number of users served by the target network cell; or
a radio frequency used by the target network cell in accordance with a signal propagation model; or
a combination thereof.

12. The positioning server of claim 10, wherein the instructions are further configured to cause the processor to:
obtain network cell information relating to a neighboring network cell that neighbors the target network cell; and
determine the MAR based on the network cell information.

13. The positioning server of claim 10 wherein the instructions are further configured to cause the processor to:
calculate a distance between the target network cell and a neighboring network cell that neighbors the target network cell; and
determine the MAR as a function of the distance multiplied by a scaling factor.

14. The positioning server of claim 10 wherein the instructions are further configured to cause the processor to set the MAR to a default value when a number of network cells is less than a threshold value.

15. The positioning server of claim 10, wherein the instructions are further configured to cause the processor to obtain, from one or more client devices, position information related to the one or more client devices or the target network cell or a combination thereof.

16. The positioning server of claim 10, wherein the at least one parameter value includes position information associated with the target network cell or one or more neighboring network cells.

17. The positioning server of claim 10, wherein the instructions are further configured to cause the processor to initiate a process to set the MAR upon detecting an event.

18. A positioning server comprising:
means for identifying a target network cell;
means for obtaining at least one parameter value indicative of network topology, or population density, or target network cell transmission radio frequency, or a combination thereof, of the target network cell identified with the means for identifying;
means for determining a maximum antenna range (MAR) associated with the target network cell based on network topology, or population density, or target network cell transmission radio frequency, or a combination thereof, indicated by the at least one parameter value; and
means for applying the MAR from the means for determining to the target network cell.

19. The positioning server of claim 18, wherein the means for determining is for determining the MAR based on:
a distance between the target network cell and a neighboring network cell;
a density of neighboring network cells;
a number of users served by the target network cell; or
a radio frequency used by the target network cell in accordance with a signal propagation model; or
a combination thereof.

20. The positioning server of claim 18, further comprising means for obtaining network cell information relating to a neighboring network cell that neighbors the target network cell, wherein the means for determining the MAR is further based on the network cell information.

21. The positioning server of claim 18, further comprising means for calculating a distance between the target network cell and a neighboring network cell that neighbors the target network cell, wherein the means for determining the MAR is further based on the distance multiplied by a scaling factor.

22. The positioning server of claim 18, further comprising means for setting the MAR to a default value when a number of neighboring network cells is less than a threshold value.

23. The positioning server of claim 18, further comprising means for obtaining, from one or more client devices, position information related to the one or more client devices or the target network cell or a combination thereof.

24. The positioning server of claim 18, wherein the at least one parameter value includes position information associated with the target network cell or one or more neighboring network cells.

25. The positioning server of claim 18, further comprising means for initiating a process to set the MAR upon detecting an event.

26. A non-transitory machine-readable medium comprising instructions for setting a maximum antenna range (MAR) and being configured to cause a machine to:
identify a target network cell;
obtain at least one parameter value indicative of network topology, or population density, or target network cell transmission radio frequency, or a combination thereof, of the target network cell;
determine the MAR associated with the target network cell based on the network topology, or the population density, or the target network cell transmission radio frequency, or the combination thereof, indicated by the at least one parameter value; and
apply the MAR to the target network cell.

27. The non-transitory machine-readable medium of claim 26, wherein the instructions are configured to cause the machine to determine the MAR based on:
a distance between the target network cell and a neighboring network cell;
a density of neighboring network cells;
a number of users served by the target network cell; or
a radio frequency used by the target network cell in accordance with a signal propagation model; or
a combination thereof.

28. The non-transitory machine-readable medium of claim 26, wherein the instructions are configured to cause the machine to:
- calculate a distance between the target network cell and a neighboring network cell that neighbors the target network cell; and
- determine the MAR based on the distance multiplied by a scaling factor.

29. The non-transitory machine-readable medium of claim 26, wherein the instructions are configured to cause the machine to set the MAR to a default value when a number of neighboring network cells is less than a threshold value.

30. The non-transitory machine-readable medium of claim 26, wherein the instructions are configured to cause the machine to obtain, from one or more client devices, position information related to the one or more client devices or the target network cell or a combination thereof.

31. The non-transitory machine-readable medium of claim 26, wherein the instructions are configured to cause the machine to initiate a process to set the MAR upon detecting an event.

\* \* \* \* \*